United States Patent Office 3,681,326
Patented Aug. 1, 1972

---

3,681,326
9-SUBSTITUTED ERYTHROMYCIN A AND B OXIMES
Anne Mary Von Esch, North Chicago, Ill., assignor to Abbott Laboratories, North Chicago, Ill.
No Drawing. Filed Jan. 11, 1971, Ser. No. 105,664
Int. Cl. C07c 47/18
U.S. Cl. 260—210 E          5 Claims

ABSTRACT OF THE DISCLOSURE

Novel 9-lower alkyl, phenyl, and benzyl substituted erythromycin A and B oximes have been found to have antibiotic activity.

DISCLOSURE OF THE INVENTION

This invention relates to novel derivatives or erythromycin A and B, and to methods for preparing them. More particularly, this invention relates to novel 9-substituted erythromycin A and B oxime derivatives having antibiotic activity of the formula

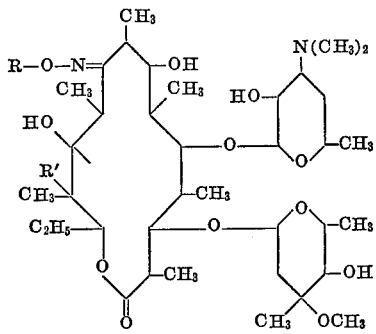

where R' is hydrogen or hydroxyl and R is $C_1$ and $C_4$ alkyl, cyclohexyl, phenyl, and benzyl. These compounds are preferably prepared by reacting erythromycin A or B with a compound of the formula $RONH_2 \cdot HX$ where R is as defined above and X is halo in an alcoholic solvent, e.g., a lower alcohol such as ethanol. The compounds $RONH_2 \cdot HX$ are known in the literature, for example, see W. Theilacker et al., Angew. Chem., 68 Jahrg. 1956, No. 8. The reaction is carried out at a temperature of from aboue 20° C. to the reflux temperature of the reactants for a period of from 2–12 hours to obtain a substantially complete reaction. Nevertheless, a longer reaction time is not deleterious to product formation and the reaction mixture can be allowed to stand for a period of days to insure complete reaction.

Since the reactant $RONH_2 \cdot HX$ is an acid addition salt and the acid is liberated during the course of the reaction, it is desirable to include a proton acceptor such as an inorganic carbonate e.g., alkali or alkaline earth carbonate, calcium carbonate and sodium carbonate being acceptable.

When the compounds of this invention are prepared from erythromycin A as starting material, it is preferable to use anhydrous solvent and reaction conditions since it is anticipated that absent anhydrous conditions the by-product "anhydroerythromycin A" (P. F. Wiley et al., J.A.C.S., 79:6062 (1957)) will irreversibly form at an acid pH. The irreversible formation of such a by-product when using erythromycin B as the starting material is not possible because of R' being H, and therefore, anhydrous reaction condition is not requisite to a successful reaction.

The following derivatives of erythromycin A and B are illustrative of compounds which can be prepared by the above described method:

9-methyl erythromycin oxime
9-ethyl erythromycin oxime
9-n-propyl erythromycin oxime
9-sec-propyl erythromycin oxime
9-sec-butyl erythromycin oxime
9-tert-butyl erythromycin oxime
9-phenyl-erythormycin oxime
9-cyclohexyl-erythromycin oxime To further illustrate the preparation of these compounds, the following specific example is set forth.

9-METHYL ERYTHROMYCIN B OXIME

To 1.4 g. of erythromycin B dissolved in 50 ml. of methanol is added 50 ml. of water. As the solution is stirred, 0.7 g. of methoxyamine hydrochloride is added. The reaction mixture is then allowed to stand at room temperature for several days. The mixture is poured into 400 ml. of water and extracted with 100 ml. portions of chloroform. The chloroform extracts are combined, dried over $MgSO_4$ and concentrated. The product is purified by column chromatography or crystallization.

$R_f$=0.39 chloroform-methanol-ammonia (95:5.1) (Silica Gel G)

$R_f$=0.62 benzene-methanol (85:15) (atmosphere saturated ammonia)

The $R_f$ values were determined according to the method described in Thin-Layer Chromatography, H. R. Bolliger et al., E. Stahl editor, Academic Press, New York (1965).

To illustrate the antibiotic properties of the 9-methyl erythromycin B oxime, the minimum inhibitory concentration (M.I.C.) was determined and is set forth below.

| Organism: | M.I.C. (micrograms/milliliter) |
|---|---|
| Staphylococcus aureus 9144 | 1.56 |
| S. aureus Smith | 1.56 |
| Streptococcus faecalis 10541 | 0.39 |

In use, the antiseptic swab can be prepared against susceptible organisms from the compounds of this invention by dissolving or suspending them in an aqueous medium in at least a concentration in excess of the M.I.C. and preferably at a concentration of from 2 to 5 micrograms per milliliter. The resulting preparation can be used to swab laboratory equipment or medical or dental instruments to insure their freedom from susceptible pathogenic organisms especially S. aureus.

I claim:
1. A compound of the formula

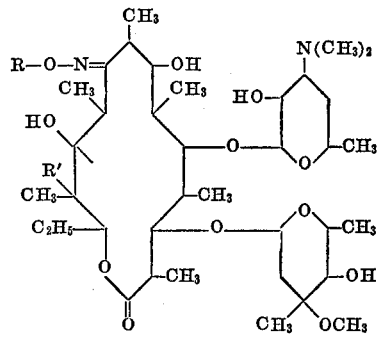

where R' is hydrogen and hydroxyl and R is $C_1$ and $C_4$ alkyl, cyclohexyl, phenyl and benzyl.

2. A compound according to claim 1 where R' is hydrogen.

3. A compound according to claim 1 where R' is hydroxyl.

4. A compound according to claim 1 where R is $C_1$ to $C_4$ alkyl.

5. A compound according to claim 4 where R is methyl.

References Cited

UNITED STATES PATENTS 3,478,014  11/1969  Djokic et al. _____260—210 E

LEWIS GOTTS, Primary Examiner

J. R. BROWN, Assistant Examiner

U.S. Cl. X.R.

424—180